United States Patent
Nam et al.

(10) Patent No.: US 7,671,942 B2
(45) Date of Patent: Mar. 2, 2010

(54) TRANSFLECTIVE LCD DEVICE AND METHOD HAVING FIRST DOMAIN IN REFLECTIVE PORTION, SECOND AND THIRD DOMAINS IN TRANSMISSION PORTION AND WITH ADDITIONAL ELECTRODES IN THIRD DOMAIN FOR THIRD STORAGE ELECTRODE

(75) Inventors: Chul Nam, Seoul (KR); Byung Ho Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 509 days.

(21) Appl. No.: 11/635,586

(22) Filed: Dec. 8, 2006

(65) Prior Publication Data
US 2007/0153142 A1 Jul. 5, 2007

(30) Foreign Application Priority Data
Dec. 29, 2005 (KR) ...................... 10-2005-0132914

(51) Int. Cl.
G02F 1/1335 (2006.01)
(52) U.S. Cl. ............................ 349/114; 349/38; 349/39
(58) Field of Classification Search .................. 349/38, 349/39, 114
See application file for complete search history.

(56) References Cited

U.S. PATENT DOCUMENTS

| | | | |
|---|---|---|---|
| 6,195,140 B1 * | 2/2001 | Kubo et al. ................... 349/44 |
| 6,330,047 B1 | 12/2001 | Kubo et al. |
| 6,927,820 B2 * | 8/2005 | Jang et al. ................... 349/114 |
| 7,372,529 B2 * | 5/2008 | Sugiura ....................... 349/113 |
| 2003/0016324 A1 | 1/2003 | Jisaki et al. |
| 2003/0193625 A1 | 10/2003 | Yoshida et al. |
| 2004/0124414 A1 | 7/2004 | Jang et al. |
| 2004/0150759 A1 * | 8/2004 | Nishino et al. ................ 349/38 |
| 2005/0078243 A1 | 4/2005 | Higa |
| 2005/0094067 A1 | 5/2005 | Sakamoto et al. |
| 2006/0050208 A1 | 3/2006 | Enomoto et al. |

* cited by examiner

Primary Examiner—John Heyman
(74) Attorney, Agent, or Firm—McKenna Long & Aldridge

(57) ABSTRACT

Provided is a transflective LCD device that can selectively use a reflect mode and a transmit mode in a VA mode LCD device having a multiple domain. The transflective LCD device includes: gate lines and data lines arranged to cross each other on a first substrate to define a pixel regions having a reflection portion and a transmission portion; thin film transistors located at each crossing of the gate lines and the data lines, wherein the thin film transistors include a gate electrode, a semiconductor layer, and source/drain electrodes; a transparent electrode connected to the thin film transistor and located in the transmission portion; a reflective electrode connected to the thin film transistor and located in the reflection portion; a connection electrode that electrically connects the transparent electrode with the reflective electrode; a first storage electrode located in the reflection portion and a second storage electrode under the connection electrode; a second substrate facing the first substrate; and a liquid crystal layer interposed between the first and second substrates.

28 Claims, 4 Drawing Sheets

FIG. 4

TRANSFLECTIVE LCD DEVICE AND METHOD HAVING FIRST DOMAIN IN REFLECTIVE PORTION, SECOND AND THIRD DOMAINS IN TRANSMISSION PORTION AND WITH ADDITIONAL ELECTRODES IN THIRD DOMAIN FOR THIRD STORAGE ELECTRODE

This application claims the benefit of Korean Patent Application No. 10-2005-0132914, filed on Dec. 29, 2005, which is hereby incorporated by reference for all purposes as if fully set forth herein.

BACKGROUND OF THE INVENTION

1. Field of the Invention

The present invention relates to a liquid crystal display (LCD) device, and more particularly, to a transflective LCD device that may selectively use a reflection mode and a transmission mode in a vertical alignment mode LCD device.

2. Discussion of the Related Art

Generally, until recently, cathode ray tubes (CRTs) have been widely used to display image data on a screen, but using CRTs is inconvenient because the CRT tubes are large in size compared to their display areas.

Today, display devices are used in personal computers, notebook computers, wireless terminals, automobile dashboards, and display boards. Also, as a large amounts of image data can be transmitted due to the growth of information telecommunication systems, a next generation display device capable of processing and realizing the large capacity image data is needed.

Next generation display devices should be lightweight and have high brightness, a large screen, low power consumption, and low manufacturing costs. Recently, LCD devices have become attractive as next generation display devices.

The LCD has excellent display resolution compared to other flat display devices and has nearly the same fast response time as that of the CRT that affects image quality when realizing moving images.

The LCD uses the optical anisotropic and dielectric characteristics of liquid crystals. Because the liquid crystals have a thin long structure, the liquid crystals have directionality in their molecular arrangement. Accordingly, the direction of the molecular arrangement can be controlled by applying an electric field to the liquid crystals (molecules).

Therefore, when the molecular direction of the liquid crystals are arbitrarily adjusted, the molecular arrangement of the liquid crystals changes, and light is refracted according to the molecular direction of the liquid crystals by the optical anisotropy, so that an image can be realized.

The twisted nematic (TN) LCD device is one of LCD devices now widely used. The TN LCD device has electrodes on two substrates, respectively, arranges the liquid crystals such that they are twisted by 90°, and applies a voltage to the electrodes to drive the liquid crystals.

Besides the TN LCD device, LCD devices may have a liquid crystal mode using dielectric anisotropy including electrically controllable birefringence (ECB) and a guest-host (GH). The ECB mode uses a negative type liquid crystal (LC) having negative dielectric anisotropy ($\Delta\epsilon<0$) where the LC is oriented in a direction perpendicular to an electric field.

A vertical alignment (VA) mode using ECB modes has a small variation in response time with respect to a gray scale voltage, and thus has an advantage where a response characteristic is excellent compared to the TN LCD device.

In the VA mode LCD device, LCs having negative dielectric anisotropy are interposed between upper and lower substrates, a VA layer is formed on facing surfaces of the upper and lower substrates, and polarizers are attached on backsides of the facing surfaces. At this point, LC driving electrodes are located on the facing surfaces, respectively, and the polarizers are attached such that polarizing axes of the respective polarizers are perpendicular to each other.

In the VA mode LCD device, the LC molecules are arranged vertically with respect to the substrates under the influence of the VA layer. Because the polarizing axes of the upper and lower polarizers are perpendicular to each other, the screen is dark.

Meanwhile, when an electric field is formed between the driving electrodes of the upper and lower substrates, the LC molecules are rotated such that they are perpendicular to a direction of the electric field according to the property of the LCs having the negative dielectric anisotropy. Accordingly, light is transmitted through the LC molecules and the screen becomes white.

Because the LC molecules have an elongated shape, refractive indexes and permittivities along a long axis and a short axis are different from each other. Accordingly, the refractive index varies depending on a direction in which the LC molecules are viewed. Consequently, the displayed image varies as a function of viewing angle.

Therefore, to solve this problem, a pixel electrode of the lower substrate is formed in a slit shape within the pixel so that multiple domains are formed in the pixtel when an electric filed is applied in a related art.

That is, when the electric field is applied between the pixel electrode and a common electrode, anisotropy between the long axis and the short axis of the LC molecule is compensated for by changing the direction of the LC molecule.

However, a multiple domain VA mode LCD device having the above construction may classified into transmissive VA mode LCD devices using a backlight as a light source and reflective VA mode LCD devices using ambient natural light and artificial light without a backlight as a light source.

The transmissive VA mode LCD device realizes a bright image even in a dark external environment using a backlight as a light source. However, the transmissive VA mode LCD device consumes much power.

On the other hand, the reflective VA mode LCD device can reduce power consumption because it does not use a backlight, but cannot be used in dark settings.

SUMMARY OF THE INVENTION

Accordingly, the present invention is directed to a transflective liquid crystal display device and a method for manufacturing the same that substantially obviate one or more problems due to limitations and disadvantages of the related art.

An advantage of the present invention is to provide a transflective LCD device that may be selectively operated in a reflection mode or a transmission mode by increasing the aperture ratio and improving image quality in a VA mode LCD device of a multiple domain structure, and a method for manufacturing the same.

Additional features and advantages of the invention will be set forth in the description that follows and in part will be apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes: gate lines and data lines arranged to cross each other on a first substrate to define a pixel regions having a reflection portion and a transmission portion; thin film transistors located at each crossing of the gate lines and the data lines, wherein the thin film transistors include a gate electrode, a semiconductor layer, and source/drain electrodes; a transparent electrode connected to the thin film transistor and located in the transmission portion; a reflective electrode connected to the thin film transistor and located in the reflection portion; a connection electrode that electrically connects the transparent electrode with the reflective electrode; a first storage electrode located in the reflection portion and a second storage electrode under the connection electrode; a second substrate facing the first substrate; and a liquid crystal layer interposed between the first and second substrates.

In another aspect of the present invention, a transflective liquid crystal display device includes: gate lines and data lines arranged to cross each other on a first substrate to define a pixel regions having a reflection portion and a transmission portion; thin film transistors located at each crossing of the gate lines and the data lines, wherein the thin film transistors include a gate electrode, a semiconductor layer, and source/drain electrodes; a transparent electrode connected to the thin film transistor and formed on the transmissions portion; a reflective electrode connected to the thin film transistor and formed on the reflection portion; a connection electrode that electrically connects the transparent electrode with the reflective electrode; and a first storage electrode located in the reflection portion, and a second storage electrode under the connection electrode.

In another aspect of the present invention, a method for manufacturing a transflective liquid crystal display device, includes: forming gate lines on a first substrate where a pixel region having a first domain and a second domain is defined, forming a storage line parallel to each gate line, a first storage electrode branched off from the storage line and formed on the first domain, and a second storage electrode formed on a boundary between the first domain and the second domain; forming an insulating layer on an entire surface of the first substrate; forming data lines crossing the gate lines; forming a thin film transistor near each crossing of the gate lines and the data lines; forming a transparent electrode connected to the thin film transistor in the second domain; forming a reflective electrode connected to the thin film transistor in the first domain; forming a connection electrode to electrically connect the transparent electrode with the reflective electrode on the second storage electrode; arranging a second substrate facing the first substrate; and interposing a liquid crystal layer between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings that are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE INVENTION

Reference will now be made in detail to an embodiment of the present invention, examples that are illustrated in the accompanying drawings.

A VA mode transflective LCD device includes both a reflection portion and a transmission portion within a unit pixel region to provide both the function of a transmissive LCD device and the function of a reflective LCD device. The VA mode transflective LCD device can make use of both light from a backlight unit and external ambient natural light or artificial light, and thus has an advantage of reducing power consumption without limitations caused by neighboring environments.

Figure 1:
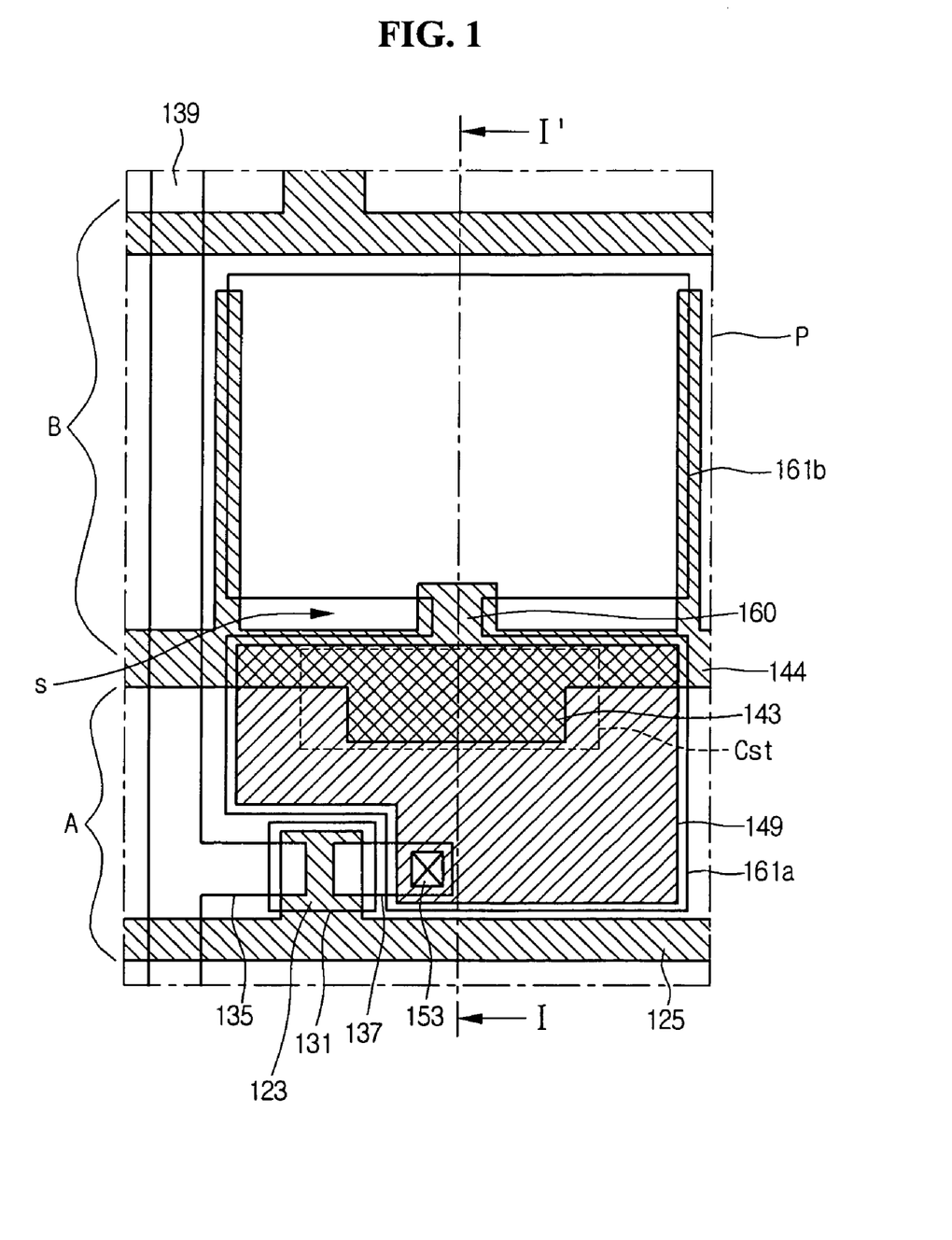
FIG. 1 is a schematic plan view illustrating a portion of a pixel portion in an array substrate of a VA mode multi-domain LCD device according to a first embodiment of the present invention.
Figure 2:
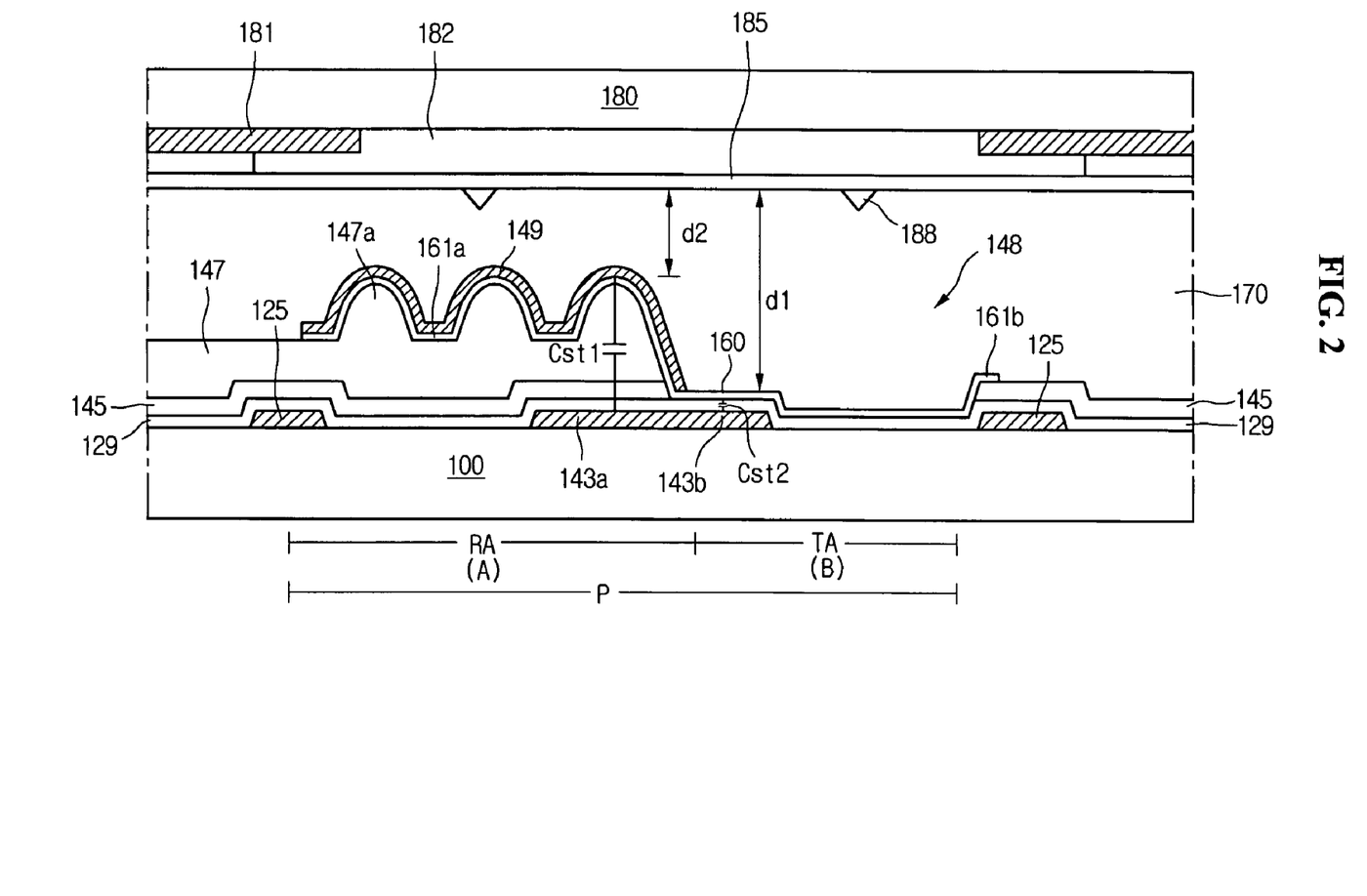
FIG. 2 is a cross-sectional view of FIG. 1, taken along a line I-I'.

FIG. 1 is a schematic plan view illustrating a portion of a pixel portion on an array substrate of a VA mode multi-domain LCD device according to a first embodiment of the present invention, and FIG. 2 is a cross-sectional view of FIG. 1, taken along a line I-I'.

Referring to FIGS. 1 and 2, the VA mode transflective LCD device includes an array substrate 100. Gate lines 125 and data lines 139 of the array substrate 100 cross each other substantially perpendicularly to define pixel regions P. A thin film transistor (TFT) is formed at each crossing of the gate lines 125 and the data lines 139. A pixel electrode connected to the TFT is divided into a first domain A and a second domain B by a slit to include a first pixel electrode 161a and a second pixel electrode 161b. The first and second pixel electrodes 161a and 161b are connected to each other by a connection pixel electrode 160.

The first and second domains A and B are electrically connected to each other by the connection pixel electrode 160 connecting the first pixel electrode 161a with the second pixel electrode 161b and driven in response to signals transmitted from the TFT.

The first domain A of the array substrate of the VA mode transflective LCD device further includes a reflective electrode 149 on or under the first pixel electrode 161a defining a reflection portion RA, and the second domain B uses the second pixel electrode 161b as a transmission portion TA (a transmission electrode) so that the VA mode transflective LCD device may selectively operate in a reflection mode and a transmission mode.

Also, the TFT includes a gate electrode 123, a source electrode 135, a drain electrode 137, and an active layer 131 formed on the gate electrode 123.

A storage line 144 is separated by a predetermined distance from and formed in parallel to the gate line 125. The storage line 144 is connected to a first storage electrode 143a and a second storage electrode 143b.

The first storage electrode 143a is formed in a portion of the reflection portion RA, and the second storage electrode 143b is formed below the connection pixel electrode 160.

A gate insulating layer 129, a passivation layer 145, and an organic insulating layer 147 stacked between the first storage electrode 143a and the first pixel electrode 161a serve as a dielectric, so that a first storage capacitor Cst1 is formed between the first storage electrode 143a and the first pixel electrode 161a above the first storage electrode 143a. Also, a second storage capacitor Cst2 is formed between the second storage electrode 143b and the connection pixel electrode 160.

Because the first storage capacitor Cst1 and the second storage capacitor Cst2 are formed to create storage capacitance in the VA mode transflective LCD device having the above-described structure, capacitance of the storage capacitors Cst almost does not change even when the size of the reflection portion RA is decreased and the size of the transmission portion is increased in order to improve an aperture ratio. Accordingly, there is almost no fluctuation in a pixel voltage drop ΔVp, and thus the aperture ratio and image quality improves.

Therefore, it is possible to make the area of the reflection portion RA greater than the area of the transmission portion TA in order to produce an aperture ratio required for a larger screen and consumer use environments.

Meanwhile, the organic insulating layer 147 may include uneven patterns 147a in the reflection portion RA, for enhancing the reflection efficiency, and an etching groove 148 in the transmission portion TA, for a dual cell gap. The reflective electrode 149 is formed on and along a curve of the uneven patterns 147a in the reflection portion RA.

A dual cell gap is realized in the reflection portion RA and the transmission portion TA of the transflective LCD device by the etching groove 148 formed in the transmission portion TA of the organic insulating layer 147. A cell gap d1 in the transmission portion TA is about twice the cell gap d2 in the reflection portion RA, so that light efficiencies of the reflection portion RA and the transmission portion TA improve.

Referring to FIG. 2, a color filter substrate 180 having a black matrix 181 and color filters 182 faces the array substrate 100. The color filter substrate 180 includes a common electrode 185.

Also, a dielectric protrusion 188 for distorting an electric field to produce a multiple domain effect is formed on the common electrode 185.

Because a dual domain VA mode LCD device having the above structure may drive LC molecules in various directions using a pixel electrode silt 's' of the array substrate 100 and the dielectric protrusion 188 of the color filter substrate 180 when driving the LC, a multiple domain effect may be produced. The first domain A may be used as the reflection portion RA, and the second domain B may be used as the transmission portion TA, so that a reflection mode and the transmission mode may be selectively driven.

Also, the aperture ratio is improved by making the area of the transmission portion greater than that of the reflection portion in the transflective LCD device.

Also, the present invention creates total storage capacitance, improves the image quality characteristic, and improves the viewing angle characteristic by forming a multiple domain and forming a storage capacitor between respective domains in a VA mode transflective LCD device.

Figure 3:
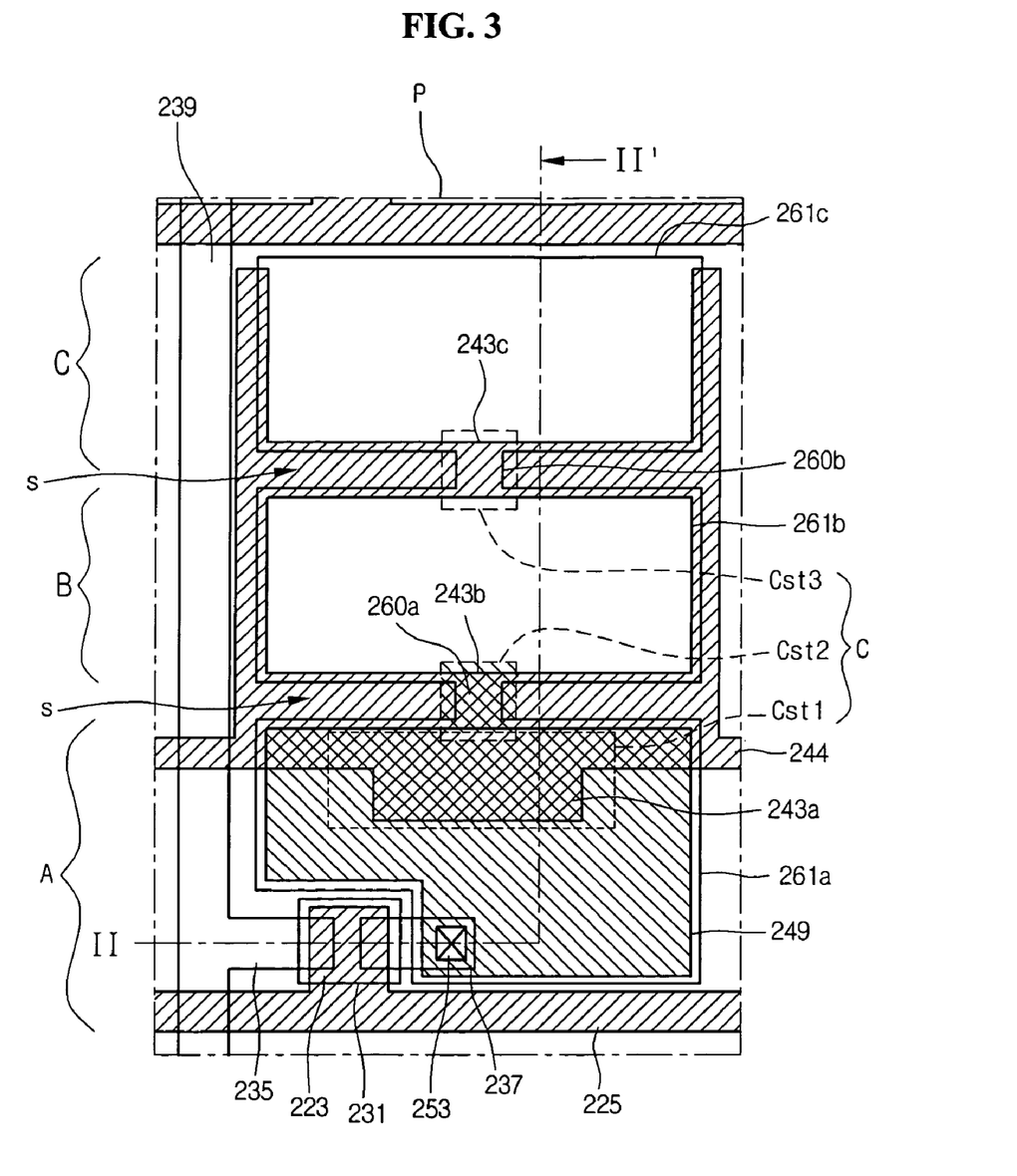
FIG. 3 is a plan view of an array substrate of a VA mode transflective LCD device according to a second embodiment of the present invention.

FIG. 3 is a plan view of an array substrate of a VA mode transflective LCD device according to a second embodiment of the present invention.

Referring to FIG. 3, the VA mode transflective LCD device includes an array substrate 200 having a plurality of TFTs, which are switching devices, arranged in a matrix. Gate lines 225 and data lines 239 cross at the TFTs.

Regions defined by crossings of the gate lines 225 and the data lines 239 are defined as pixel regions P.

The TFT includes a gate electrode 223, a source electrode 235, a drain electrode 237, and an active layer 231 formed on the gate electrode 223.

A storage line 244 is separated by a predetermined distance from and formed in parallel to the gate line 225. A plurality of storage electrodes 243 connected with the storage line 244 are formed in the pixel region P.

Because a multiple domain VA mode LCD device having the above structure may drive LC molecules in various directions using a pixel electrode silt 's' of the array substrate 200 and a dielectric protrusion 288 of a color filter substrate 280 when driving the LC, a multiple domain effect may be produced. The first domain A may be used as a reflection portion RA, and a second domain B and a third domain C may be used as a transmission portion TA, so that a reflection mode and the transmission mode may be selectively driven.

The aperture ratio may be improved by making the area of a transmission portion TA greater than that of a reflection portion RA in the transflective LCD device.

A reflective electrode 249 is formed in the reflection portion RA, and a pixel electrode 261 is connected to a drain electrode 237 of the TFT. The pixel electrode is divided into a first domain A, a second domain B, and a third domain C by a slit 's' to include a first pixel electrode 261a, a second pixel electrode 261b, and a third pixel electrode 261c. The first to third pixel electrodes 261a, 261b, and 261c are connected by first and second connection pixel electrodes 260a and 260b.

Also, the first pixel electrode 261a and the reflective electrode 249 are formed in the reflection portion RA, and the second and third pixel electrodes 261b and 261c are formed in the transmission portion TA to allow the transmission of light.

The first to third domains A, B, and C are electrically connected by a first connection pixel electrode 260a for connecting the first pixel electrode 261a with the second pixel electrode 261b, and a second connection pixel electrode 260b for connecting the second pixel electrode 261b with the third pixel electrode 261c, and driven in response to signals transmitted by the TFT.

Though not shown, an organic insulating layer 247 having an uneven pattern 247a to improve the reflection efficiency is formed in the reflection portion RA. An etching groove 248 is formed in the organic insulating layer 247 of the transmission portion TA to create a dual cell gap. The reflective electrode 249 is formed on and along a curve of the unevenness pattern 247a of the reflection portion RA.

Meanwhile, as described above briefly, a plurality of storage electrodes 243 connected with the storage line 244 are formed in the pixel region P.

The storage electrode 243 includes a first storage electrode 243a, a second storage electrode 243b, and a third storage electrode 243c. The first storage electrode 243a forms a first storage capacitor Cst1 in cooperation with the first pixel electrode 261a in the reflection portion RA, the second storage electrode 243b forms a second storage capacitor Cst2 in cooperation with a first connection pixel electrode 260a between the first and second domains A and B. Also, the third storage electrode 243c forms a third storage capacitor Cst3 in cooperation with a second connection pixel electrode 260b between the second and third domains B and C.

The sum of the capacitances of the first to third storage capacitors Cst1, Cst2, and Cst3 becomes the capacitance of one pixel.

A portion between the first and second domains A and B, and a portion between the second and third domains B and C are separated a predetermined distance by a slit 's' to separate the pixel electrodes 261a, 261b, and 261c. Because the LC layer 270 located in a position corresponding to the slit 's' is not driven, the storage line 244 may be connected to the second and third storage electrodes 243b and 243c in the position where the slit 's' is formed.

When the transflective LCD device has multiple domains, a storage capacitor is generally formed in a reflection portion RA. When the storage capacitor Cst1 is formed in the reflection portion RA, and the storage capacitors Cst2 and Cst3 are formed in a predetermined region of the transmission portion TA, that is, the connection pixel electrode for electrically connecting the respective domains, a capacitance C can be formed. Therefore, when the size of the reflection portion RA is decreased in order to improve an aperture ratio, capacitance of the storage capacitor may be compensated for, and a pixel voltage drop is decreased, so that image quality may be improved.

A gate insulating layer 229, a passivation layer 245, and an organic insulating layer 247 stacked between the storage line 244, the storage electrode 243, and the pixel electrode, the connection pixel electrodes 261a, 260a, and 260b serve as a dielectric.

Meanwhile, the VA mode transflective LCD device according to the present invention is applied not only to a multiple domain transflective LCD device having a triple domain structure where a first domain A is used as a reflection portion RA and a second domain B and a third domain C are used as transmission portions TA, but also to a multiple domain transflective LCD device, wherein one pixel region is divided into at least two domains and the area of a reflection portion RA is greater than that of a transmission portion TA in the multiple domain.

Figure 4:
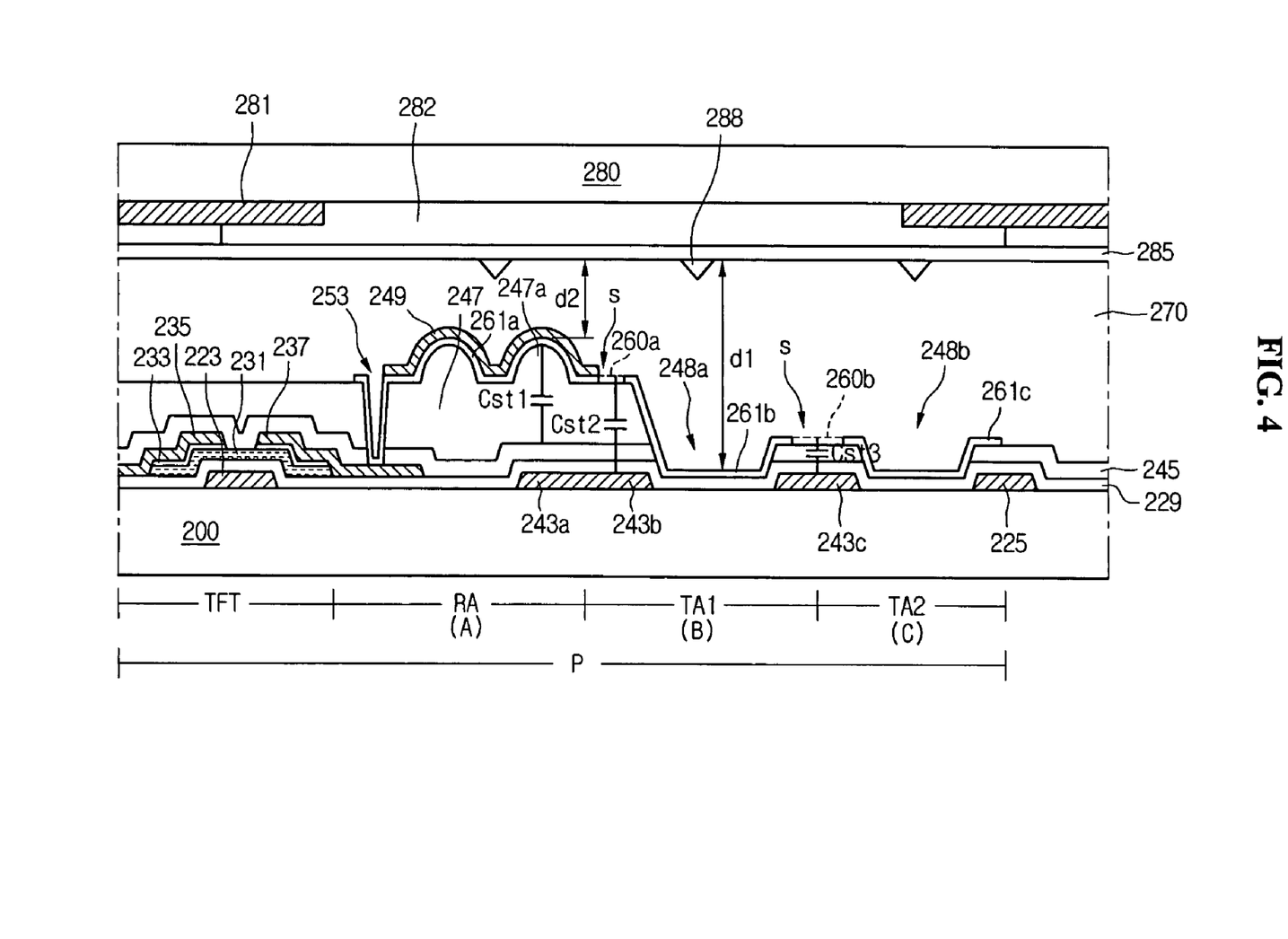
FIG. 4 is a cross-sectional view of FIG. 3, taken along a line II-II'.

FIG. 4 is a cross-sectional view of FIG. 3, taken along a line II-II'.

Referring to FIG. 4, the first domain A of the array substrate of the VA mode transflective LCD device further includes a reflective electrode 249 on or under the first pixel electrode 261a for use as a reflection portion RA, and the second and third domains B and C use the second and third pixel electrode 261b and 261c as transmission portions TA (transmission electrodes) so that the VA mode transflective LCD device may selectively operate in a reflection mode and a transmission mode.

A method for manufacturing a VA mode transflective LCD device will be described with reference to FIG. 4.

First, the gate electrodes 223, the gate lines 225, the storage lines 244 where the storage line 244 separated by a predetermined distance from the gate lines 225, and the storage electrode 243 are formed on the array substrate 200.

The storage electrode 243 includes the first storage electrode 243a, the second storage electrode 243b, and the third storage electrode 243c. The first storage electrode 243a forms the storage capacitor Cst1 in the reflection portion RA, the second storage electrode 243b forms the storage capacitor Cst2 between the first and second domains A and B, and the third storage electrode 243c forms the storage capacitor Cst3 between the second and third domains B and C.

The gate insulating layer 229, which is a first insulating layer, is formed on an entire surface of the array substrate 200 including the gate lines 225.

The active layer 231 and an ohmic contact layer 233 are formed in an island shape on the gate insulating layer 229 on the gate electrode 223.

Next, the source electrode 235 and the drain electrode 237 contacting the ohmic contact layer 233, and the data lines 239 connected to the source electrode 235 are formed on an entire surface of the array substrate 200 including the ohmic contact layer 233.

The ohmic contact layer 233, the active layer 231, the source/drain electrodes 235 and 237, and the data lines 239 may be formed using a one mask process.

The passivation layer 245, which is a second insulating layer, may be formed by depositing an insulating material on the array substrate 200 including the data lines 239.

The passivation layer 245 may be an inorganic insulating layer formed by depositing $SiN_x$ or $SiO_2$.

An organic insulating layer 247, which is a third insulating layer 247, may be formed on the passivation layer 245 by coating a material, for example, a transparent organic insulating material including benzo-cyclo-butene.(BCB) or an acryl-based resin.

The uneven pattern 247a is formed in an upper portion of the organic insulating layer 247 in the reflection portion RA.

A first etching groove 248a and a second etching groove 248b are formed in a portion of the pixel region P by etching the gate insulating layer 229, the passivation layer 245, and the organic insulating layer 247.

The first etching groove 248a is formed at a position corresponding to the second domain B used as the transmission portion TA1, and the second etching groove 248b is formed in a position corresponding to the third domain C used as the transmission portion TA2.

The first and second etching grooves 248a and 248b form a dual cell gap in the reflection portion RA and the transmission portion TA of the transflective LCD device. A cell gap d1 of the transmission portion TA is about twice a cell gap d2 of the reflection portion RA in order to improve a light efficiency of the reflection portion RA and the transmission portion TA.

The second storage electrode 243b formed between the second domain B and the third domain C is not exposed.

Also, a drain contact hole 253 exposing a portion of the drain electrode 237 is formed.

A transparent pixel electrode contacting the drain electrode 237 and formed in the pixel region P are formed by depositing and patterning a material, for example, a transparent conductive metal such as indium-tin-oxide (ITO) or indium-zinc-oxide (IZO) on the organic insulating layer 247.

The pixel electrode is divided into a first domain A, a second domain B, and a third domain C by slits 's' to include a first pixel electrode 261a, a second pixel electrode 261b, and a third pixel electrode 261c. The first to third pixel electrodes 261a, 261b, and 261c are connected by connection pixel electrodes 260a and 260b.

Also, the first pixel electrode 261a and the reflective electrode 249 are formed in the reflection portion RA, and the second and third pixel electrodes 261b and 261c are formed in the transmission portion TA to allow the transmission of light.

The first to third domains A, B, and C are electrically connected by a first connection pixel electrode 260a and a second connection pixel electrode 260b for connecting the first to third pixel electrodes 261a, 261b, and 261c, and driven in response to signals transferred from the TFT.

The first pixel electrode 261a is formed with an uneven structure along the uneven patterns 247a of the organic insulating layer 247 in the reflection portion RA.

Also, the reflective electrode 249 is formed in the reflection region RA by depositing and patterning metal having excellent reflectance such as aluminum and an aluminum alloy (e.g., AiNd) on an entire surface of the substrate including the pixel electrodes 261a, 261b, and 261c.

The reflective electrode 249 is uneven along the uneven structure of the organic insulating layer 247, and the first pixel electrode 261a in the reflection portion RA.

The reflective electrode 249 may be formed under the first pixel electrode 261a as well as on the first pixel electrode 261a.

Also, a color filter substrate 280 having a black matrix 281 and color filters 282 faces the array substrate 200. The color filter substrate 280 includes a common electrode 285.

A dielectric protrusion 288 for distorting an electric field to produce a multiple domain effect is formed on the common electrode 285. A vertically aligned LC layer 270 is interposed between the array substrate 200 and the color filter substrate 280.

Because a triple domain VA mode LCD device having the above structure may drive LC molecules in various directions using pixel electrode silts 's' of the array substrate 200 and the dielectric protrusion 288 of the color filter substrate 280 when driving the LC, a multiple domain effect may be produced. The first domain A may be used as the reflection portion RA, and the second and third domains B and C may be used as the transmission portions TA, so that a reflection mode and the transmission mode may be selectively driven.

In the triple domain structure, which is an embodiment of the transflective LCD device according to the present invention, the first domain A is used as the reflection portion RA, the second and third domains B and C are used as the transmission portions B and C, so that the area of the transmission portion TA is greater than that of the reflection portion RA, and thus the aperture ratio increases. Also, because the storage capacitor Cst1 is. formed in the reflection portion RA, and the storage capacitors Cst2 and Cst3 are formed in a predetermined region of the transmission region TA, e.g., the connection pixel electrode for electrically connecting respective domains, the capacitance of the storage capacitors can be fixed. Therefore, even when the size of the reflection portion RA is decreased in order to improve the aperture ratio, the capacitance of the storage capacitors can be compensated for and thus image quality may be improved.

A method for manufacturing the VA mode transflective LCD device having the above-described construction will be described below.

First, gate lines, a storage line parallel to the gate lines, a first storage electrode branching from the storage line and formed in a first domain, and a second storage electrode formed in a boundary between the first domain and a second domain are formed on a first substrate where pixel regions having the first domain and the second domain are defined.

An insulating layer is formed on an entire surface of the first substrate.

After that, data lines crossing the gate lines are formed. Then, are formed at crossings of the gate lines and the data lines.

Each of the TFTs includes a gate electrode protruding from each gate line, an insulating layer formed on the gate electrode, a semiconductor layer formed on a portion of the insulating layer that corresponds to the gate electrode, and a source electrode and a drain electrode separated from each other on the semiconductor layer.

Next, a transparent electrode electrically connected to the TFT is formed in the second domain, and a reflective electrode connected to the TFT is formed in the first domain.

The transparent electrode may be formed under the reflective electrode.

A connection electrode for electrically connecting the transparent electrode with the reflective electrode is formed on the second storage electrode. The connection electrode may be formed of the same material as that of the transparent electrode in the same layer.

Also, a second substrate facing the first substrate is disposed, and an LC layer is interposed between the first and second substrates.

Additional, uneven patterns may be further formed under the reflective electrode.

Meanwhile, the first domain may be a reflection portion, the second domain may be a transmission portion, and a third domain may be further formed.

The first to third domains may have substantially the same area, and the second and third domains may be transmission portions.

A connection electrode for electrically connecting the transparent electrode or the reflective electrode formed in adjacent domains may be formed in a boundary between the first to third domains.

Also, a third storage electrode is further formed under the connection electrode, so that capacitance of the storage capacitors can be sufficiently fixed in the pixel region.

A dielectric protrusion can be further formed on the second substrate. The dielectric protrusion is formed in a boundary between the domains to determine a driving direction of LC molecules.

Also, a cell gap of the second domain may be substantially twice that of the first domain in the transflective LCD device, but is not limited to this.

The second substrate further includes a black matrix formed on a position corresponding to a neighboring region of the pixel, and color filters formed on regions corresponding to pixel regions.

The transflective LCD device according to the present invention improves an aperture ratio by making an area of the transmission portion greater than that of the reflection portion.

Also, the present invention fixes the total storage capacitance, improves image quality, and improves a viewing angle characteristic by forming multiple domains and forming a storage capacitor between respective domains in a VA mode transflective LCD device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device comprising:
   gate lines and data lines arranged to cross each other on a first substrate to define a pixel regions having a reflection portion and a transmission portion;
   thin film transistors located at each crossing of the gate lines and the data lines, wherein the thin film transistors include a gate electrode, a semiconductor layer, and source/drain electrodes;
   a transparent electrode connected to the thin film transistor and located in the transmission portion;
   a reflective electrode connected to the thin film transistor and located in the reflection portion;
   a connection electrode that electrically connects the transparent electrode with the reflective electrode;
   a first storage electrode located in the reflection portion and a second storage electrode under the connection electrode;
   a second substrate facing the first substrate; and a liquid crystal layer interposed between the first and second substrates, wherein the pixel region includes three domains, a first domain located in the reflection portion, and a second domain and a third domain each located in the transmission portion, wherein the third domain includes an additional transparent electrode and an additional connection electrode that is formed between the third domain and the transparent electrode of the second domain, wherein a third storage electrode is further formed under the additional connection electrode.

2. The transflective liquid crystal display device according to claim 1, wherein the reflection portion includes uneven patterns.

3. The transflective liquid crystal display device according to claim 1, further comprising a storage line spaced a predetermined distance from one of the gate lines and connected to the first and second storage electrodes.

4. The transflective liquid crystal display device according to claim 1, further comprising a dielectric layer formed between the second storage electrode and the connection electrode.

5. The transflective liquid crystal display device according to claim 1, wherein the liquid crystal layer comprises vertically aligned liquid crystal molecules.

6. The transflective liquid crystal display device according to claim 1, wherein an area of the transmission portion is greater than an area of the reflection portion.

7. The transflective liquid crystal display device according to claim 1, wherein the transparent electrode located in the transmission portion includes a slit.

8. The transflective liquid crystal display device according to claim 1, wherein the second substrate includes a black matrix formed at a position corresponding to a neighboring region of the pixel regions, and color filters in positions corresponding to the pixel regions.

9. The transflective liquid crystal display device according to claim 1, wherein the second substrate further includes a dielectric protrusion.

10. The transflective liquid crystal display device according to claim 1, wherein a cell gap of the transmission portion is about twice the cell gap of the reflection portion.

11. The transflective liquid crystal display device according to claim 1, wherein at least two of the first to third domains have a different liquid crystal driving direction.

12. The transflective liquid crystal display device according to claim 1, further comprising an insulating layer having an etching groove in the transmission portion on the first substrate.

13. A transflective liquid crystal display device comprising:

gate lines and data lines arranged to cross each other on a first substrate to define a pixel regions having a reflection portion and a transmission portion;

thin film transistors located at each crossing of the gate lines and the data lines, wherein the thin film transistors include a gate electrode, a semiconductor layer, and source/drain electrodes;

a transparent electrode connected to the thin film transistor and formed on the transmission portion;

a reflective electrode connected to the thin film transistor and formed on the reflection portion;

a connection electrode that electrically connects the transparent electrode with the reflective electrode; and a first storage electrode located in the reflection portion, and a second storage electrode under the connection electrode, wherein the pixel region includes three domains, a first domain located in the reflection portion, and a second domain and a third domain each located in the transmission portion, wherein the third domain includes an additional transparent electrode and an additional connection electrode that is formed between the third domain and the transparent electrode of the second domain, wherein a third storage electrode is further formed under the additional connection electrode.

14. The transflective liquid crystal display device according to claim 13, wherein the reflection portion includes uneven patterns.

15. The transflective liquid crystal display device according to claim 13, further comprising a storage line spaced a predetermined distance from one of the gate lines and connected to the first and second storage electrodes.

16. The transflective liquid crystal display device according to claim 13, further comprising a dielectric layer formed between the second storage electrode and the connection electrode.

17. The transflective liquid crystal display device according to claim 13, wherein an area of the transmission portion is greater than an area of the reflection portion.

18. The transflective liquid crystal display device according to claim 13, wherein the transparent electrode located in the transmission portion includes a slit.

19. The transflective liquid crystal display device according to claim 13, further comprising an insulating layer having an etching groove in the transmission portion on the substrate.

20. A method for manufacturing a transflective liquid crystal display device, comprising:

forming gate lines on a first substrate where a pixel region having a first domain and a second domain is defined, forming a storage line parallel to each gate line, a first storage electrode branched off from the storage line and formed on the first domain, and a second storage electrode formed on a boundary between the first domain and the second domain;

forming an insulating layer on an entire surface of the first substrate;

forming data lines crossing the gate lines;

forming a thin film transistor near each crossing of the gate lines and the data lines;

forming a transparent electrode connected to the thin film transistor in the second domain;

forming a reflective electrode connected to the thin film transistor in the first domain;

forming a connection electrode to electrically connect the transparent electrode with the reflective electrode on the second storage electrode;

arranging a second substrate facing the first substrate; and interposing a liquid crystal layer between the first substrate and the second substrate, wherein the pixel region further has a third domain, wherein the third domain includes an additional transparent electrode and an additional connection electrode is formed between the third domain and the transparent electrode of the second domain, wherein a third storage electrode that is further formed under the additional connection electrode.

21. The method according to claim 20, further comprising forming uneven patterns under the reflective electrode.

22. The method according to claim 20, wherein the liquid crystal layer comprises vertically aligned liquid crystal molecules.

23. The method according to claim 20, wherein the first domain is a reflection portion and the second domain is a transmission portion.

24. The method according to claim 20, further comprising:
   forming a black matrix on portions corresponding to neighboring regions of pixel regions on the second substrate; and
   forming color filters in positions corresponding to the pixel regions.

25. The method according to claim 20, further comprising forming a dielectric protrusion on the second substrate.

26. The method according to claim 20, wherein a cell gap of the second domain is about twice the cell gap of the first domain.

27. The method according to claim 20, wherein the first and second domains have a different liquid crystal driving direction.

28. The method according to claim 20, further comprising forming an insulating layer having an etching groove in a transmission portion of the first substrate.

* * * * *